United States Patent Office 3,514,485
Patented May 26, 1970

3,514,485
PRODUCTION OF 3-ACETAMIDOTRI-
CYCLO[2.2.1.0$^{2,6}$]HEPTANE
John R. Norell, Bartlesville, Okla., assignor to Phillips
Petroleum Company, a corporation of Delaware
No Drawing. Continuation-in-part of application Ser. No.
560,859, June 27, 1966. This application July 31, 1967,
Ser. No. 657,019
Int. Cl. C07c *103/34*
U.S. Cl. 260—561                2 Claims

ABSTRACT OF THE DISCLOSURE

Production of bicyclic and tricyclic amides by the reaction of cycloolefinically unsaturated bicyclic hydrocarbons with a cyanide and hydrogen fluoride upon hydrolysis of the imidoyl fluoride intermediate.

BACKGROUND OF THE INVENTION

This application is a continuation-in-part application of my copending application having Ser. No. 560,859, filed June 27, 1966.

This invention relates to a process for the production of amides and imidoyl fluorides. In another aspect, this invention relates to a process for the production of amides upon hydrolysis of imidoyl fluoride products resulting from the reaction of a bicyclic olefin with a cyanide in the presence of hydrogen fluoride. In accordance with a further aspect, this invention relates to novel amide products produced in accordance with said aforementioned process.

In the preparation of amides by employing the Ritter reaction, in which a suitable nitrile and a suitable olefin are reacted in the presence of a material such as strong sulfuric acid, it is frequently difficult to control the reaction temperature and extensive efforts are usually required in order to insure the control of the dangerous exotherm resulting from such a reaction. Also, in the known procedures for the preparation of amides processes have sometimes resulted in poor yields of the desired product.

According to the invention set forth in my copending application, noted above, it was found that the yields of amides could be substantially increased by carrying out the reaction of saturated and ethylenically unsaturated hydrocarbons and cyanides in the presence of hydrogen fluoride. Further according to said copending application, it was found that by carrying out the reaction of saturated and ethylenically unsaturated hydrocarbons with a cyanide in the presence of sulfur dioxide, isomerization and polymerization side reactions were minimized.

Accordingly, an object of this invention is to provide a process for the production of bicyclic and tricyclic amides.

Another object of this invention is to increase the yield of bicyclic and tricyclic amides formed from olefins and cyanides.

A further object of this invention is to provide novel amide products.

Other aspects, objects and the several advantages of this invention will be apparent to those skilled in the art from a study of this disclosure and the appended claims.

In accordance with the invention set forth in said copending application, saturated and ethylenically unsaturated hydrocarbons are reacted with cyanides in the presence of hydrogen fluoride with or without a solvent. Further, in accordance with said copending application, the reactants are so chosen as to yield imino fluorides which are capable of forming amides upon hydrolysis. Further, according to said copending application, the reactants are so chosen as to yield amines.

SUMMARY OF THE INVENTION

In accordance with the present invention a process for the production of bicyclic and tricyclic amides from olefins is provided which comprises contacting a bicyclic olefin with a cyanide in the presence of hydrogen fluoride to form an imidoyl fluoride intermediate, and hydrolyzing said fluoride to form said amide.

DESCRIPTION OF PREFERRED EMBODIMENT

In accordance with the invention, the cyclic olefins that can be reacted according to the process of the invention are selected from the group consisting of bicycloheptenes, alkyl-substituted bicycloheptenes, bicyclooctenes, alkyl-substituted bicyclooctenes, and 2,5-norbornadiene, wherein the cyclic olefin preferably does not contain more than about 12 carbon atoms per molecule.

Examples of some of the cyclic olefins that can be used in the process of the invention are:

bicyclo[3.2.1]oct-2-ene,
2-norbornene,
2,5-norbornadiene,
4-methylbicyclo[3.2.1]oct-2-ene,
5,8,8-trimethylbicyclo[3.2.1]oct-2-ene,
5-butylbicyclo[3.2.1]oct-2-ene,
2-methyl-2-norbornene,
1-methyl-6-ethyl-2-norbornene,
5-pentyl-2-norbornene, and the like.

Cyanide compounds that can be reacted according to the invention have the formula $$R'CN$$

wherein R' is selected from the group consisting of hydrogen and alkyl, cycloalkyl and aryl radicals, and combinations thereof such as alkaryl radicals, aralkyl radicals, and the like, the number of carbon atoms in said radicals preferably not exceeding about 24 carbon atoms. When hydrogen cyanide is to be employed, it is possible to use an alkali metal cyanide which will react in situ with the hydrogen fluoride to produce hydrogen cyanide.

Examples of some cyanides which can be employed in the process of this invention include: hydrogen cyanide, acetonitrile, propionitrile, butyronitrile, hexanenitrile, decanenitrile, hexadecanenitrile, pentacosanenitrile, isobutyronitrile, 2,2-dimethylhexanenitrile, 4-ethyldodecanenitrile, cyclohexanecarbonitrile, 3-methylcyclopentanecarbonitrile, cyclopentaneacetonitrile, benzonitrile, phenylacetonitrile, p-tolunitrile, and the like.

When the cyclic olefins are reacted with cyanides in the presence of hydrogen fluoride according to my invention, an imidoyl fluoride group is formed. Further, according to the invention, the imidoyl fluorides are hydrolyzed to amides.

In accordance with this invention, an amide having the formula $$RNHCOR'$$

is produced upon hydrolysis of the imidoyl fluoride intermediate resulting from the reaction of a cyclic olefin as defined above with a cyanide as defined above in the presence of hydrogen fluoride, wherein R is selected from the group consisting of bicycloheptyl, alkyl-substituted bicycloheptyl, bicyclooctyl, alkyl-substituted bicyclooctyl, and tricyclo[2.2.1.0$^{2,6}$]hept-3-yl, and R' is as defined above in connection with the cyanide. In the above formula the number of carbon atoms in R preferably does not exceed about 12 and the number of carbon atoms in R' preferably does not exceed about 24. When an unsubstituted or alkyl-substituted bicycloheptene or bicyclooctene is used as the cyclic olefin, R is an unsubstituted or alkyl-substituted bicycloheptyl or bicyclooctyl radical. When 2,5-norbornadiene is used as the cyclic olefin reactant, R is a tricyclo[2.2.1.0^{2,6}]hept-3-yl radical.

Examples of some amides which can be produced by the process of this invention include:

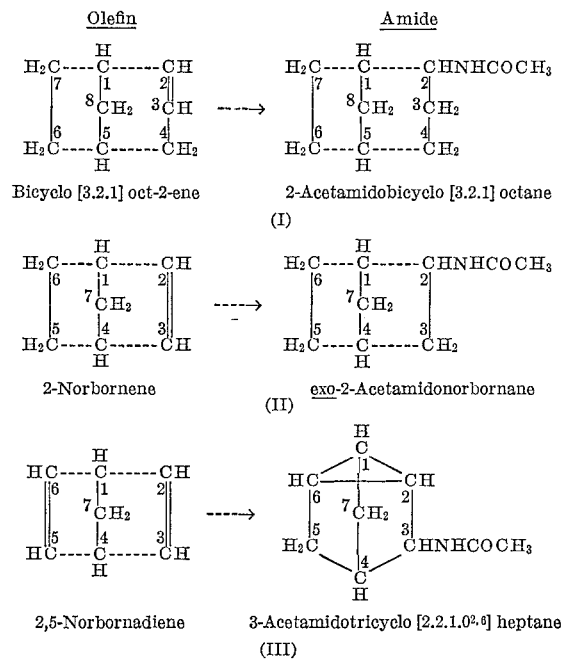

Additional examples of amides which can be produced by this process include:

4-methyl-2-formamidobicyclo[3.2.1]octane,
5,8,8-trimethyl-2-benzamidobicyclo[3.2.1]octane,
5-butyl-2-pentacosanamidobicyclo[3.2.1]octane,
2-methyl-2-(3-methylpentanamido)norbornane,
1-methyl-6-ethyl-2-cyclohexanecarboxamidonorbornane,
5-pentyl-2-(2-phenylacetamido)norbornane,
3-dodecanamidotricyclo[2.2.1.0^{2,6}]heptane, and the like.

In the process of this invention, the cyanide can be either hydrogen cyanide or an organic cyanide or nitrile as described above. Although the cyanide:olefin mole ratio can vary over a broad range, it will generally be within the range of about 0.2:1 to 20:1, preferably being within the range of about 0.5:1 to 5:1. The hydrogen fluoride:olefin mole ratio also can vary over a wide range, but will generally be within the range of about 2:1 to 60:1, preferably being within the range of about 5:1 to 40:1. Although the hydrogen fluoride can be used in a substantially anhydrous form, it can also be employed as an aqueous solution containing up to 40 weight percent or more water, in which instance at least a portion of the imidoyl product is hydrolyzed to the amide prior to any subsequent hydrolysis step. If desired, a diluent, e.g., water, an acid such as acetic acid or propionic acid, or an ether such as diethyl ether or dibutyl ether, can be employed in the process.

Although the reaction utilizing hydrogen fluoride can be carried out over a rather broad temperature range, the temperature will generally be within the range of about −70 to 150° C., preferably being within the range of about 0 to 70° C. The reaction time can vary considerably, depending in part on the reaction temperature and the nature of the reactants, but will generally be within the range of about 1 minute to 48 hours, usually being within the range of about 10 minutes to 5 hours. The reaction pressure need only be sufficient to keep the reactants substantially in the liquid phase.

When the reaction is carried out in a solvent, such as sulfur dioxide or sulfolane, as disclosed in said copending application, the ratio of solvent to olefin can vary over a wide range. Up to about 5,000 milliliters of solvent per mole of olefin will be satisfactory, but generally 1,000 milliliters, or less, per mole of olefin will be employed.

In carrying out the reaction, the cyanide is preferably added to the hydrogen fluoride, in the presence or absence of a diluent, followed by the addition of the olefin as such or dissolved in a diluent. However, any order of addition can be used. The resulting mixture is then agitated in any convenient manner. Upon substantial completion of the reaction, the reaction mixture can be treated with water, with or without prior recovery of free hydrogen fluoride by distillation or other suitable means. The hydrolyzed mixture can be neutralized by conventional procedures employing sodium hydroxide, sodium carbonate, ammonia, ammonium hydroxide, and the like, and the amides can then be separated by conventional methods such as extraction with ether, chloroform, methylene chloride, hexane, and the like. The amides are then isolated and purified by well known procedures such as distillation, crystallization, and the like.

In carrying out the reaction in the presence of $SO_2$, the sulfur dioxide, hydrogen fluoride, cyanide, and olefin can be added in any order. In a preferred procedure, the cyanide is added to a mixture of the sulfur dioxide and hydrogen fluoride, in the presence or absence of a diluent, followed by the addition of the olefin as such or dissolved in a diluent. The resulting mixture is then agitated in any convenient manner. Upon substantial completion of the reaction, the reaction mixture can be treated with water, with or without prior recovery of sulfur dioxide and hydrogen fluoride by distillation or other suitable means. The hydrolyzed mixture can be neutralized by conventional procedures employing sodium hydroxide, sodium carbonate, ammonia, and the like, and the amides can then be separated by conventional methods such as extraction with ether, chloroform, methylene chloride, hexane, and the like. The amides are then isolated and purified by well known procedures such as distillation, crystillization, and the like.

As set forth in said copending application, I have further found that both the yield and purity of the product produced by the reaction of olefins with cyanides in the presence of hydrogen fluoride can be improved by the addition of water and/or ammonium fluoride to the reaction mixture. This improvement in the reaction product is noted with those olefins which are capable of forming terftiary carbonium ions, and with cyclic olefins generally, even when these are not capable of forming tertiary carbonium ions.

The process of the present invention can likewise be carried out in the presence of water and/or ammonium fluoride so as to minimize undesirable reactions such as polymerization occurring during the course of the desired reaction. The ratios of ammonium fluoride and/or water to olefin and/or hydrogen fluoride employed in the present invention can be the same as set forth in said copending application. The same is true for the other conditions of temperature, pressure, time and recovery of products.

The amides produced by the process of this invention, as well as the amines derived therefrom, have utility in pharmaceutical formulations, and are particularly valuable as antiviral agents. The amides and amines are also useful as pesticides, e.g., acaricides, arachnocides, and nematocides, and germicides, fungicides, and the like. The imidoyl fluoride compounds produced by the process of this invention are useful intermediates in the production of amines.

EXAMPLE I

To a cold mixture of 40 g. (2.0 moles) of hydrogen fluoride and 6.0 g. (0.146 mole) of acetonitrile in a 450-ml. polyethylene reactor was added 10.8 g. of an 83 weight percent solution of bicyclo[3.2.1]oct-2-ene (0.083 mole) in ethylbenzene. The stirred mixture was allowed to warm to about 25° C., at which temperature it was stirred for 30 minutes. The reaction mixture was poured on ice, neutralized with ammonium hydroxide, and extracted with ether. The ether extract was dried over a mixture of magnesium sulfate and potassium carbonate, after which the solvent was evaporated under reduced pressure to give as a residue 13.0 g. of a pale yellow solid. Two recrystallizations of this solid from a hexane-cyclohexane solution gave as a white solid 2-acetamidobicyclo[3.2.1]octane ($C_{10}H_{17}NO$) melting at 132° C.–134° C., in good agreement with the value of 134° C. reported by earlier workers. The identity of the product was confirmed by elemental analysis and molecular weight determination.

Analysis.—Calcd. for $C_{10}H_{17}NO$: (percent): C, 71.81; H, 10.24; N, 8.37; mol. wt., 167. Found (percent): C, 72.20; H, 10.10; N, 8.34; mol. wt., 166.

As further confirmation of the identity of the product, the infrared and nuclear magnetic spectra were consistent with those to be expected for a compound of the assigned structure.

EXAMPLE II

To a cold mixture of 60 g. (3.0 moles) of hydrogen fluoride and 6.25 g. (0.15 mole) of acetonitrile was added 14.1 g. (0.15 mole) of 2-norbornene (bicyclo[2.2.1]hept-2-ene). The mixture was stirred for 1 hour at about 25° C. The reaction mixture was then poured on ice, neutralized with ammonium hydroxide, and extracted with ether. The ether extract was dried, and the solvent was evaporated under reduced pressure to give as a residue 17.0 g. of a white solid. A portion of this solid was recrystallized from hexane to give exo-2-acetamidonorbornane (exo - 2-acetamidobicyclo[2.2.1]heptane; $C_9H_{15}NO$) melting at 140° C.–141° C., in good agreement with the value of 143° C.–144° C. reported by earlier workers. The identity of the product was confirmed by elemental analysis and molecular weight determination.

Analysis.—Calcd. for $C_9H_{15}NO$ (percent): C, 70.54; H, 9.86; N, 9.14; mol. wt. 153. Found (percent): C, 70.94; H, 10.03; N, 8.81; mol. wt., 150.

Further confirmation of the identity of the product was provided by the infrared and nuclear magnetic resonance spectra, which were consistent with those to be expected for a compound of the assigned structure.

EXAMPLE III

To an ice-chilled mixture of 50 g. (2.5 moles) of hydrogen fluoride, 15 g. (0.37 mole) of acetonitrile, and 5 g. of water was added 13.8 g. (0.15 mole) of 2,5-norbornadiene (bicyclo[2.2.1]hepta-2,5-diene), resulting in an exothermic reaction. The mixture was stirred at about 25° C. for 30 minutes, after which the reaction mixture was poured on ice. The resulting mixture was made basic with ammonium hydroxide and was then extracted with ether. The ether extract was dried, and the solvent was evaporated under reduced pressure to give as a residue 10.0 g. of a viscous yellow liquid which partially solidified on standing. The solid was filtered and recrystallized from hexane to give 3.0 g. of white fluffy crystals melting at 89° C.–93° C. A portion of these crystals was sublimed at 80° C./0.25 mm. to give white needles melting at 93° C.–95° C. These needles were identified as 3-acetamidotricyclo[$2.2.1.0^{2,6}$]heptane by elemental analysis, by a study of their infrared and nuclear magnetic resonance spectra, and by mass spectrometry.

Analysis.—Calcd. for $C_{19}H_{13}NO$ (percent): C, 71.49; H, 8.66; N, 9.26; mol. wt. 151. Found (percent): C, 68.56; H, 8.62; N, 8.93; mol. wt., 151.

The infrared and nuclear magnetic resonance spectra were consistent with those to be expected for a compound of the assigned structure. The fragmentation observed in the mass spectrometer analysis also was consistent with that to be expected for a compound of the assigned structure.

EXAMPLE IV

The 3-acetamidotricyclo[$2.2.1.0^{2,6}$]heptane of Example III was tested as a fungicide for bean rust. The host-rust system employed was Uromyces phaseoli on Phaseolus vulgaris var. Pinto, which was tested in four-inch clay pots. The test procedure used is as follows:

A dosage of 45 ml. of the test formulation is drenched on each pot. This test formulation contains 0.1 g. of the test chemical, 4.0 ml. of acetone, 2.0 ml. of stock emulsifier solution (0.5 percent Triton X–155 in water by volume), and 94.0 ml. of distilled water. The concentration of toxicant in this formation is 1000 parts per million.

Twenty-four hours after application of the test chemical, the plants are inoculated by atomizing onto the plant leaves a single aqueous suspension containing the uredospore species. Subsequently the plants are kept for an overnight incubation period at 60° F. and 100 percent relative humidity. Pustule counts are made seven to ten days after inoculation, and effective control is reported as percent disease control based upon pustule development in nontreated control plants.

When tested by the above procedure, 3-acetamidotricyclo[$2.2.1.0^{2,6}$]heptane functioned as a fungicide against bean rust, giving a value of 50 for the percent disease control.

I claim:

1. A process for the production of 3-acetamidotricyclo[$2.2.1.0^{2,6}$]heptane which comprises reacting 2,5-norbornadiene with acetonitrile and hydrogen fluoride at a temperature in the range −70 to 150° C. to form an imidoyl fluoride intermediate and then hydrolyizing and subsequently neutralizing and extracting with ether to yield 3-acetamidotricyclo[$2.2.1.0^{2,5}$]heptane.

2. The process according to claim 1 wherein the mole ratio of acetonitrile to 2,5-norbornadiene is in the range 0.1:1 to 20:1 and the hydrogen fluoride to 2,5-norbornadiene mole ratio is in the range of 2:1 to 60:1, and wherein said neutralizing is effected with ammonium hydroxide.

References Cited
UNITED STATES PATENTS 3,338,967  8/1967  Potts et al. _____ 260—583

ALEX MAZEL, Primary Examiner

J. A. NARCAVAGE, Assistant Examiner

U.S. Cl. X.R.

260—558; 424—320, 324